(12) United States Patent
Garber

(10) Patent No.: US 11,565,948 B2
(45) Date of Patent: Jan. 31, 2023

(54) PLASMA TREATMENT SYSTEM WITH MULTIPLE HORIZONTAL CHANNELS

(71) Applicant: James B. Garber, Ann Arbor, MI (US)

(72) Inventor: James B. Garber, Ann Arbor, MI (US)

( * ) Notice: Subject to any disclaimer, the term of this patent is extended or adjusted under 35 U.S.C. 154(b) by 0 days.

(21) Appl. No.: 17/027,386

(22) Filed: Sep. 21, 2020

(65) Prior Publication Data

US 2021/0101804 A1 Apr. 8, 2021

Related U.S. Application Data

(60) Provisional application No. 62/903,291, filed on Sep. 20, 2019.

(51) Int. Cl.
| | | |
|---|---|---|
| *C02F 1/30* | (2006.01) | |
| *C02F 1/46* | (2006.01) | |
| *H05H 1/48* | (2006.01) | |
| *C02F 1/24* | (2006.01) | |
| *C02F 101/36* | (2006.01) | |

(52) U.S. Cl.
CPC .............. *C02F 1/30* (2013.01); *C02F 1/24* (2013.01); *C02F 1/4608* (2013.01); *H05H 1/48* (2013.01); *C02F 2101/36* (2013.01)

(58) Field of Classification Search
CPC ...... C02F 1/30; C02F 1/46; C02F 1/72; C02F 1/24; H05H 1/48
See application file for complete search history.

(56) References Cited

FOREIGN PATENT DOCUMENTS

CN 106232528 A * 12/2016 .............. C02F 1/78

* cited by examiner

*Primary Examiner* — Cameron J Allen
(74) *Attorney, Agent, or Firm* — Rohm & Monsanto, PLC

(57) ABSTRACT

A system using electrical discharge plasma (EDP) for treating a liquid, such as water or waste water to degrade or destroy polar contaminants such as per- and polyfluoroalkyl substances (PFAS) compounds, the system includes a sealed process tank and multiple submerged EDP channels stacked horizontally. Each EDP channel consists of a cathode and an anode, a gas hood, and a gas diffuser. The basic submerged EDP channel is bounded by a plate at the bottom and a submerged gas hood at the top which creates a gas headspace, and hence, a local water surface to provide a local gas/liquid interface in each channel. The cathode lies above the local water surface and anode lies below the local water surface. Each EDP channel may have a gas diffuser at the bottom of the EDP channel for introducing a process gas into the liquid creating bubbles that carry contaminants in the liquid to the local gas/liquid interface. An electrical discharge arcs between the cathode and the anode to generate a plasma used for destruction of contaminants in the water or wastewater at the local gas/liquid interface.

7 Claims, 3 Drawing Sheets

PLASMA TREATMENT SYSTEM WITH MULTIPLE HORIZONTAL CHANNELS

FIELD OF THE INVENTION

The invention relates generally to plasma treatment system for destruction of contaminants in liquid, and more particularly to a plasma treatment system with multiple, horizontal, parallel treatment channels.

BACKGROUND OF THE INVENTION

This section is intended to provide information relating to the field and background of the invention and thus any approach/functionality described below should not be assumed to be qualified as prior art merely by its inclusion in this section.

There is significant interest in using plasma to treat contaminants in water and wastewater that are highly resistant to destruction by other means. Consequently, plasma is the subject of ongoing research in university and private sector laboratories. While the technology shows progress, scientists and engineers are still working to identify superior system configurations and address economical scale-up for those systems.

Synthetic organic compounds as a major group of contaminants in wastewater are of concern worldwide due to their severe problems for the environment and human health. Thus, in the cases of unavoidable contaminant emissions, these emerging compounds must be treated to satisfy the stringent water quality regulations before discharging into aquatic ecosystem. As wastewater remediation becomes a global concern, the development of innovative advanced processes for wastewater treatment is still a major challenge. With regard to its fast reaction rate and environmental compatibility, electrical plasma generation for contaminant removal from liquids is utilized.

Poly- and perfluoroalkyl substances (PFAS) are a group of fluorinated organic anthropogenic chemicals that are resistant to chemical destruction. Per- and polyfluorinated substances (PFAS) are a class of xenobiotic compounds that have contaminated the environment through human activity and production. PFAS are found in wastewater, drinking water, and groundwater, and are not substantially removed by traditional water treatment technologies. Poly- and perfluoroalkyl substances (PFAS) are a class of organofluorine compounds that are persistent in the environment, bioaccumulative, and can be soluble in aqueous matrices PFAS are thermally stable, lipid and water repelling, and have been deemed "forever chemicals".

PFAS have been liberally used over the past 60 years in aqueous film forming foam (AFFF), household products such as carpets, paper, and non-stick cookware, and even coated cardboard takeout containers. Extensive groundwater and surface water contamination of PFAS originates from a variety of sources, including industrial and commercial manufacturing plants that produce or use PFAS, contaminated biosolids application, contaminated landfill leachate, wastewater and water treatment plants discharges, and AFFF training facilities. Drinking water supplies for millions of U.S. residents have been contaminated with various PFAS, with both perfluorooctanesulfonic acid (PFOS) and perfluorooctanoic acid (PFOA) often surpassing the US EPA's lifetime health advisory (70 ng/L). Since this advisory was set for these two compounds, most research done to date focuses on PFOS and PFOA, but a growing number of studies are investigating a wider range of PFAS, including perfluorocarboxylic acids (PFCA), perfluorosulfonic acids (PFSA), fluorotelomer sulfonates (FtS), and a number of unknown precursor PFAS compounds that are also present in the contaminated water.

One example of prior art is known. The Plasma Research Group at Clarkson University, led by Dr. Selma Mededovic Thagard, has developed two prototypes of an Enhanced Contact Electrical Discharge Plasma (EDP) system, which they have been testing for destruction of per- and polyfluoroalkyl substances (PFAS) compounds. The shallow, rectangular prototype version (subsequently referred to as the Clarkson prototype) is considered prior art for the current invention. A description of Clarkson prototype is given in Chemical & Engineering News, Vol. 97, No. 12, p. magazine/97/09712 (Mar. 25, 2019) and US Publication No. 2018/0339921 laid open on Nov. 29, 2018, for example. The disclosure of US Publication No. 2018/0339921 is incorporated herein by reference as background of invention. However, Clarkson's pipe-based prototype is not relevant to the current invention and will not be considered further. For the purposes of this discussion, target contaminant(s) will refer to PFAS or generic target compounds.

The Clarkson prototype is a flow-through system consisting of a reservoir with a diffuser for argon gas, at the bottom. A cathode grid is located above the water surface and anodic plates are located below the water surface. The system is closed at the top, with argon gas in the headspace. As water is pumped through the system, argon gas is bubbled through the diffuser, conveying the PFAS to the gas/water interface. The plasma generated by the electrodes destroys the PFAS by breaking the hydrophobic, hydrocarbon chains above the gas/liquid interface. For the purposes of this discussion, process gas will refer to argon or other gases (or gas mixtures) suitable for plasma generation.

The need for a gas headspace makes it difficult to scale up this type of EDP system. In fact, DMaxPlasma, a spinoff company started by Dr. Thagard and Dr. Holsen of Clarkson University, indicate on their web site (as of Aug. 22, 2019), "The plasma reactor is modular (reactor dimensions are: L×W×H=30"×20"×0.25"), meaning it can be scaled for a specific treatment rate and/or multiple reactors can be used side-by-side. The reactors are mobile, easy to bring to a contaminated site and place in line with other treatment operations, can readily be moved within a site to operate at different locations at different times, and can be operated either continuously or pulsed on demand." The description of multiple units placed side by side suggests that the team is currently not able to stack these units in a common process tank. It should be noted that the height given for the unit does not appear to be correct. From the information available, the height is greater than 0.25 inches. That apparent error does not affect the present invention.

Another example of prior art is known. The Nanjing Gongcheng Energy Saving New Materials Research Institute has carried out "Water treatment method based on plasma," which was led by Liu Dong, Sun Junjie, Lu Jun, and Ye Tianbao. A description of the Nanjing Gongcheng Energy Saving New Materials Research Institute water plasma treatment method is given in Chinese Application No. CN110844975A laid open on Feb. 28, 2020. This water treatment method based on plasma includes a sewage storage reactor, a high-voltage power supply and a high-voltage electrode, wherein the high-voltage electrode contains a positive electrode and a grounding electrode, the positive electrode and the grounding electrode are respectively fixed at the upper part and the lower part of the sewage storage reactor, and the two electrodes are connected with a high-voltage power supply through wires. A baffle is provided at a side of the effluent storage reactor near the effluent outlet, wherein the baffle plate is loaded with a first catalyst on the left side.

This application is an example of water plasma treatment, but it performs its operation with a catalyst for preventing harmful byproducts and does not utilize either a gas diffuser or gas hood for contaminant(s) removal.

Another example of prior art is known. The University of Michigan has carried out a project entitled "Plasma water purifier having packed bed discharges with water dielectric barriers," which was led by John E Foster and Mujovic Selman. A description of The University of Michigan plasma water purifier with water dielectric barriers is given in US Patent No. U.S. Ser. No. 10/662,086B2 issued on May 26, 2020. The system for water purification having a water inlet being distributed into a plurality of streams defining extended dielectric barrier layers with high surface area to volume ratios and a plasma disposed between at least a pair of the plurality of water streams forming a surface plasma attachment producing radicals that treat the water via diffusion. Plasma system having a powered electrode and a ground electrode disposed within the chamber responsive to an applied voltage, the plasma system configured to receive the gas from the gas inlet and output a plasma within the interstitial spaces between each of the plurality of water streams, at the surface of each of the plurality of water streams, and within each of the plurality of water streams via propagation forming at least a surface plasma attachment producing reactive species that purify the water. The aforementioned system utilizes plasma (ionized gas) for the purpose of water purification; plasma produces radicals that oxidize organic contaminant(s); and it removes them on oxidation principle instead of diffusion mechanism.

Another example of prior art is known. The Wuhu Hualu Environmental Protection Technology Co Ltd has carried out a project entitled "Apparatus and method for treating medical wastewater by low temperature plasma", which was led by Huang Qing, Zhang Qifu, Wei Xing, Zhang Hong and Ke Zhigang. A description of Wuhu Hualu Environmental Protection Technology Co Ltd on medical wastewater treatment by low temperature plasma is given in Chinese Application No. CN108640228A laid open on Oct. 12, 2018. The apparatus includes a low temperature plasma power supply, a plasma discharge reactor, a water collecting tank and a gas supply system, wherein the low temperature plasma power supply is connected with the plasma discharge reactor, and the plasma discharge reactor is arranged in a gas-collecting hood of the gas supply system, high-voltage electrodes of the plasma discharge reactor perform plasma discharge on oxygen in the gas-collecting hood to generate ozone, and finally, the ozone is used to treat the medical wastewater in the water collecting tank. According to the apparatus and method, a dielectric barrier discharge technology is adopted to generate the low temperature plasma, high energy electrons, ultraviolet light, ozone, etc. generated by the low temperature plasma discharge are used to degrade the medical wastewater. This patent is an example of wastewater treatment by using plasma, but it does not contain a channel arrangement for contaminant removal.

Yet another example of prior art is known. The Korea Basic Science Institute has carried out a project entitled "Recalcitrant Organic Matter Treatment Apparatus and Method Using Plasma Underwater Discharge Method", which was led by Ryu Seung Min and Park Jun Seuk. A description of The Korea Basic Science Institute on its method of using plasma underwater discharge is given in Korean Patent No. KR101660712B1 laid open on Sep. 29, 2016. The Korean device for treating a non-biodegradable organic material by using a plasma underwater discharge method includes a non-biodegradable organic material supplying unit; a reaction unit for converting a the non-biodegradable organic material into a decomposable organic material by performing plasma underwater discharge treatment using a plasma dual electrode on a material supplied from the non-biodegradable organic material supplying unit; and a microorganism reaction unit for biologically treating the decomposable organic material treated from the reaction unit. The plasma dual electrode has an inner side made of a ceramic material, and an outer side made of a metal material, wherein discharge is performed only in the outside of a capillary tube of the ceramic material. The above mentioned system and method is an example of plasma treatment of decomposable organic material from water, but it does not involve horizontal channels for operation.

It would be desirable to have an effective method to scale up the EDP system by stacking multiple EDP channels in a common process tank, each EDP channel having a gas headspace and corresponding local water surface (i.e., gas/liquid interface).

It would further be desirable to be able to operate such a system in either continuous flow or batch modes.

It would further be desirable to be able to treat either water or wastewater, or a stream resulting from pretreatment of a water or wastewater stream to concentrate the target contaminant(s) (via DAF, RO, or other technologies). Pretreating to concentrate the target contaminant(s) could reduce the required EDP system size and cost. It could also further reduce the system size by reducing or eliminating the need for bubbling process gas through diffusers in the EDP process tank.

Consequently, there is a need for the EDP system which is made by stacking multiple EDP channels in a common process tank. There is a growing need to develop a system and method for treating contaminants in liquid that are highly resistant to destruction. Thus, the present invention, which is devised to solve the problems and disadvantages of prior art as described above.

OBJECT OF THE INVENTION

This section is intended to introduce certain objects of the disclosed methods and systems in a simplified form, and is not intended to identify the key advantages or features of the present disclosure.

The main object of the present invention is to provide a plasma treatment system with multiple horizontal channels.

Another object of the present invention is to provide a plasma treatment system with multiple stacking EDP channels in a common process tank.

A further object of the present invention is to provide a plasma treatment system to provide submerged EDP channels having a gas headspace and corresponding local water surface (i.e., gas/liquid interface).

It is still a further object of the present invention to provide a plasma treatment system for treating target contaminant(s) in liquid that are highly resistant to destruction.

These and other objects, features and advantages of the present invention will become more apparent from the following description when taken in connection with the accompanying drawing which shows, for the purpose of illustration only, one embodiment in accordance with the present invention.

SUMMARY OF THE INVENTION

This summary is provided to introduce a selection of concepts in a simplified format that are further described in the detailed description of the invention. This summary is not intended to identify key or essential inventive concepts of the invention, nor is it intended for determining the scope of the invention.

In order to overcome problems of conventional systems used for liquid plasma treatment, the present invention discloses the plasma treatment system with multiple horizontal channels.

The invention relates generally to plasma treatment system for destruction of contaminant(s) in liquid, and more particularly to an EDP treatment system with multiple, horizontal, parallel treatment channels.

The basic system comprises a sealed process tank with more than one EDP channels, positioned such that they are stacked vertically. In the basic system, each EDP channel consists of a gas diffuser at the bottom of the EDP channel, a cathode above the liquid surface, and an anode below the liquid surface. The basic submerged EDP channel is bounded by a plate at the bottom and a submerged gas hood at the top. The top of the gas hood for one EDP channel can function as the bottom plate for the EDP channel above it. For the top EDP channel, no gas hood is required. For the bottom EDP channel, no bottom plate is required.

There are numerous possible configurations for the EDP channels in a process tank. These include, but are not limited to, arranging vertically, side by side, and overlapping.

The gas hood is essentially a downturned tray that, when submerged, provides a headspace containing the process gas and the cathode.

In the basic system, the influent enters the process tank and flows horizontally through the multiple EDP channels in parallel. As the liquid flows through each EDP channel, the gas bubbles (such as argon, recirculated from the top of the process tank) from a diffuser convey the contaminant(s) to the liquid/gas interface. There, plasma generated by electrical discharge acts on the contaminant(s), as described elsewhere by the Clarkson team. The treated effluent exits from the outlet end of the process tank.

If the gas bubbles are introduced prior to multiple EDP channels, this could reduce or eliminate the need for diffusers in each EDP channel. This could also reduce the depth required for each channel, allowing more EDP channels in a given height process tank. This could be accomplished by locating a gas diffuser in or before the influent zone. Alternately, an eductor-type gas injector could be used to inject the process gas, in the influent pipe, upstream of the EDP process tank.

If a concentration step is used for PFAS or target contaminant(s) in a separate, upstream process, this could significantly reduce the size of the required EDP process tank. There are various ways to concentrate PFAS. Reported alternatives include reverse osmosis (RO) and adsorption on synthetic resins (and subsequent regeneration, producing a concentrated regenerant stream).

Another means of PFAS concentration would be conventional dissolved air flotation (DAF), with or without parallel plates or tubes. The use of DAF would concentrate PFAS (or other polar contaminants) at the liquid surface of the DAF, allowing removal of the contaminants in a concentrated stream of liquid and/or foam (instead of the floated sludge that is usually scraped from the surface).

It has been proposed to use EDP at the surface of a DAF unit. This would involve sealing the top of the DAF unit and recirculating the process gas. However, it is thought to be desirable to decouple the concentration step from the EDP treatment step, to be able to optimize the two operations separately. In addition, using separate operations would allow use of commonly available DAF equipment with air, rather than a custom DAF unit with recirculating process gas (such as argon) and electrodes for plasma generation.

An equalization tank upstream of the EDP treatment system could also be used for the contaminant concentration step. This would involve installing fine bubble diffusers in the tank, and pumping liquid/foam from the surface of the tank to the EDP treatment system.

Any alternative using air bubbles to float the PFAS could require a degassing step ahead of the EDP treatment system, to avoid diluting the process gas in the EDP system.

Other continuous flow configurations are also possible. In a basic upflow configuration, a process tank could have one gas diffuser located at the bottom of the process tank, with EDP baffles placed at various levels in the tank. The influent would be introduced at the bottom of the tank. The multiple EDP baffles would cause the liquid to travel in a serpentine flow path as it rises in the process tank.

Batch treatment configurations are also possible. These could operate in a cycle similar to Sequencing Batch Reactors used for biological wastewater treatment. The cycle would include Fill, React, Degas (if needed), and Drain steps. Multiple tanks could be used, so one or more tanks could be filling while the active tank goes through the React, Degas, and Drain steps. A process gas reservoir could be used to conserve the process gas during filling and draining operations.

Another embodiment can be used to treat liquid in large tanks, reservoirs or natural water bodies. This embodiment would consist of one or more EDP levels. The top EDP level would have a gas hood floating on the surface of the liquid, to contain and allow for recirculation of the process gas.

To the accomplishment of the foregoing and related ends, certain illustrative aspects of the disclosure are described herein in connection with the following description and the annexed drawing. These aspects are indicative, however, of but a few of the various ways in which the principles of the disclosure can be employed and the subject disclosure is intended to include all such aspects and their equivalents. Other advantages and novel features will become apparent from the following detailed description of the disclosure when considered in conjunction with the drawing.

To further clarify advantages and features of the present invention, a more particular description of the invention will be rendered by reference to specific embodiments thereof, which is illustrated in the appended drawing. It is appreciated that this drawing depicts only typical embodiments of the invention and are therefore not to be considered limiting its scope. The invention will be described and explained with additional specificity and detail with the accompanying drawings.

BRIEF DESCRIPTION OF DRAWING

In order to better understand the present invention plasma treatment system with multiple horizontal channels, the characteristics of object of the present invention, will be better viewed from the detailed description hereinafter, which is only for a way of example, associated to the drawings referenced below, which are an integral part of this application. The parts in the drawings are not drawn to scale; the main objective is to understand the components, their arrangement and their working.

Figure 1A:
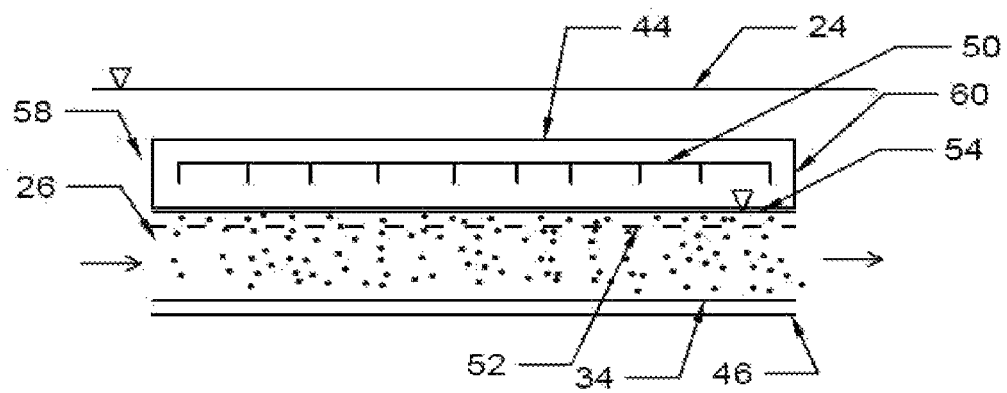
FIG. 1a and FIG. 1b are profile views of a basic, submerged EDP channel and a basic, submerged EDP baffle, respectively.

Further, skilled artisans will appreciate that elements in the drawings are illustrated for simplicity and may not have been necessarily been drawn to scale. Furthermore, in terms of the construction of the product, have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system and/or method, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, the term "and/or" includes any and all combinations and arrangements of one or more of the associated listed items.

Unless otherwise defined, all technical and scientific terms used herein have the same meaning as commonly understood by one of ordinary skill in the art to which this invention belongs.

Any headings provided herein are for convenience only and do not necessarily affect the scope or meaning of the claimed invention.

Embodiments of the present invention will be described below in detail with reference to the accompanying drawings The detailed description of the plasma treatment system with multiple horizontal channels; object of the present invention will be made in accordance with the identification of components that form the basis of the figures described above.

As used herein, the following terms and variations thereof have the meanings given below, unless a different meaning is clearly intended by the context in which such term is used. Definitions, where the definition of terms departs from the commonly used meaning of the term, applicant intends to utilize the definitions provided below, unless specifically indicated.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "liquid" refers to a substance that is capable of flowing. The liquid can be an aqueous liquid, including water or wastewater, wherein water or wastewater refers to a liquid comprising one or more contaminants, which includes organic compounds, bacteria, and metal ions. Wastewater may also include solid inert materials such as undissolved polymeric materials, dirt, and sand.

For purposes of the present disclosure, the term "plasma treatment" refers to liquid plasma treatment, which can be performed in such a manner that contaminant can be removed from liquid, typified by gas as its main component is introduced into a reaction system to generate plasma.

For purposes of the present disclosure, the term "electrode" refers to an electrical conductor used in contact with another material that is often non-metallic in a device that can be incorporated into an electrical circuit. Herein both cathode and anode are used for liquid treatment.

For purposes of the present disclosure, the term "electrical discharge plasma" refers to a system for treating contaminant(s) from liquid by passing plasma, wherein plasma is generated by electrical discharge; which acts on the contaminant(s).

For purposes of the present disclosure, the term "channel" refers to a conduit within the system which is primarily used to carry a liquid, wherein liquid includes, but not limited to, water or wastewater.

For purposes of the present disclosure, the term "contaminant(s)" refers to materials in the water or wastewater that are different from the target substance(s) and are desirably excluded from the final target substance product(s). Contaminants, refers to runoff, raw sewage, industrial wastewater, leachate, human waste, effluent and the like. Polar contaminant(s) include per- and polyfluoroalkyl substances (PFAS) compounds and are referred to herein as "target contaminants".

For purposes of the present disclosure, the term "process tank" refers to any container that is suitable for the removing contaminant(s) from liquid by plasma treatment.

For purposes of the present disclosure, the term "gas hood" refers to a gas holding unit and is segment of process tank.

After observing all above problems in the prior art, the idea of developing system for plasma treatment of water or wastewater with multiple horizontal channels is disclosed in the present invention detailed description which is plasma treatment system with multiple horizontal channels.

Plasma treatment of water and wastewater has been the subject of significant research. There are several different options for process gases (including gas mixtures) and numerous process configurations. The current invention applies to the EDP process, generally as implemented in the Clarkson pilot, although it would also apply to other processes requiring a gas headspace above each treatment channel.

A brief description of the EDP process is presented below, as implemented in the Clarkson prototype. This description is included as background for the invention and is not intended to be an exhaustive review of plasma technology.

The Clarkson prototype consists of a single, sealed process tank, comprising a gas diffuser at the bottom of the process tank, a grid of point-type cathodes above the water surface, and long rectangular strip anodes under the water surface. The process gas (argon) is drawn from the headspace of the process tank and bubbled through the diffuser. The process gas bubbles provide a large surface area for polar surfactants such as PFAS to accumulate at the gas/liquid interface. At the water surface, plasma is produced by electrical discharge between the electrodes. The plasma acts on the hydrocarbon chains on the hydrophobic portion of the PFAS molecules, which extend above the water surface.

Referring to the figures, wherein like numerals indicate like or corresponding parts throughout the several views, FIG. 1a shows a profile view of a basic, submerged EDP channel. The flow through the EDP channel (26) is horizontal. The gas diffuser (34) is located at the bottom of the EDP channel (26) and is used to bubble process gas through the water in the EDP channel (26) (recirculated from the process gas held under the gas hood (44) or from the top of the sealed process tank (22)). The process gas carries the target contaminant(s) to the local water surface (54), where polar contaminants are exposed to the process gas. The gas hood (44) remains full of process gas. Excess process gas flows to the open edge(s) of the gas hood (44), and then is released to rise in the process tank (22). The cathode (50) is located above the local water surface (54). The anode (52) is located below the local water surface (54). The electrical connections and power supply are not shown, for clarity, but are familiar to those skilled in the art. Electrical discharge arcing between the cathode (50) and the local water surface (54) (en route to the anode (52)) creates plasma from the process gas in the gas hood (44). The plasma reacts with the target contaminant(s) at the local water surface (54).

The gas hood front wall (58) and gas hood back wall (60) of the gas hood (44) are shown as having the same height, for simplicity. In another embodiment, either the gas hood front wall (58) or gas hood back wall (60) is shorter than the other, to direct the flow of process gas bubbles to rise at either end of the process tank (22). Alternately, an inverted V notch in one of the gas hood (44) walls could be used to direct the gas bubbles to rise at a certain location. This could be desirable, in the event that an additional EDP layer is used to treat any residual contaminant in the process gas bubbles as they arrive at the surface of the process tank (22).

A screen (not shown) can be placed below the process tank water surface (24) and/or local water surface (54) to reduce or eliminate the foam created by the process gas bubbles, if needed.

Figure 1B:
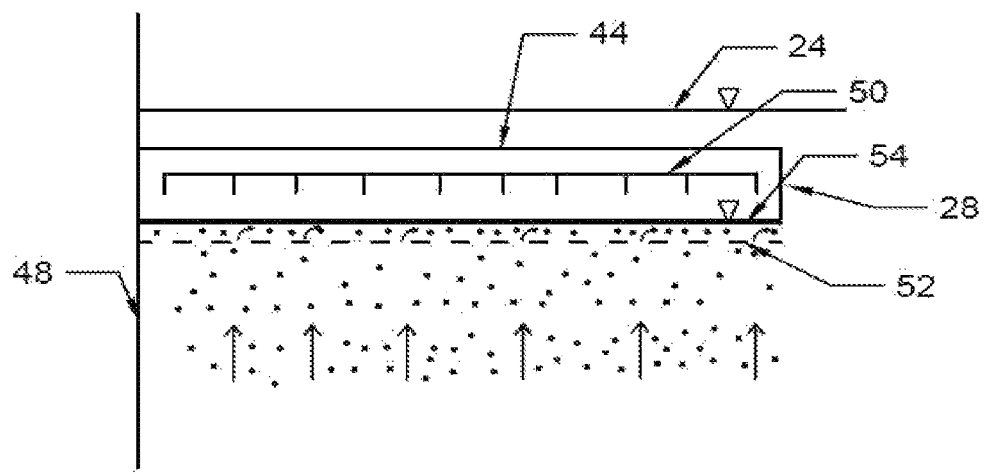

FIG. 1b shows a profile view of an EDP baffle (28). The EDP baffle (28) can be used with upflow-type system, to provide EDP treatment at one or more locations/elevations in the flow path. As in other systems with baffles, there are numerous possible configurations. In FIG. 1b, the EDP baffle (28) is joined to the side wall (48) of the process tank (22) (not shown). The gas hood (44) holds process gas and maintains a local water surface (54). The cathode (50) is located above the local water surface (54). The anode (52) is located below the local water surface (54). The electrical connections and power supply are not shown, for clarity, but are familiar to those skilled in the art.

Process gas bubbles are introduced prior to or below the EDP baffle (28), using a gas diffuser (34) or other means (not shown). As the flow and the process gas bubbles travel up through the process tank (22), the target contaminant(s) move from the bulk liquid to the surface of the process gas bubbles. The water and process gas bubbles flow upward until the flow is redirected by the EDP baffle (28). Electrical discharge arcing between the cathode (50) and the anode (52) creates plasma from the process gas. The plasma reacts with the target contaminant(s) at the local water surface (54).

A screen (not shown) can be placed below the process tank water surface (24) and/or local water surface (54) to reduce or eliminate the foam created by the process gas bubbles, if needed.

Figure 2:
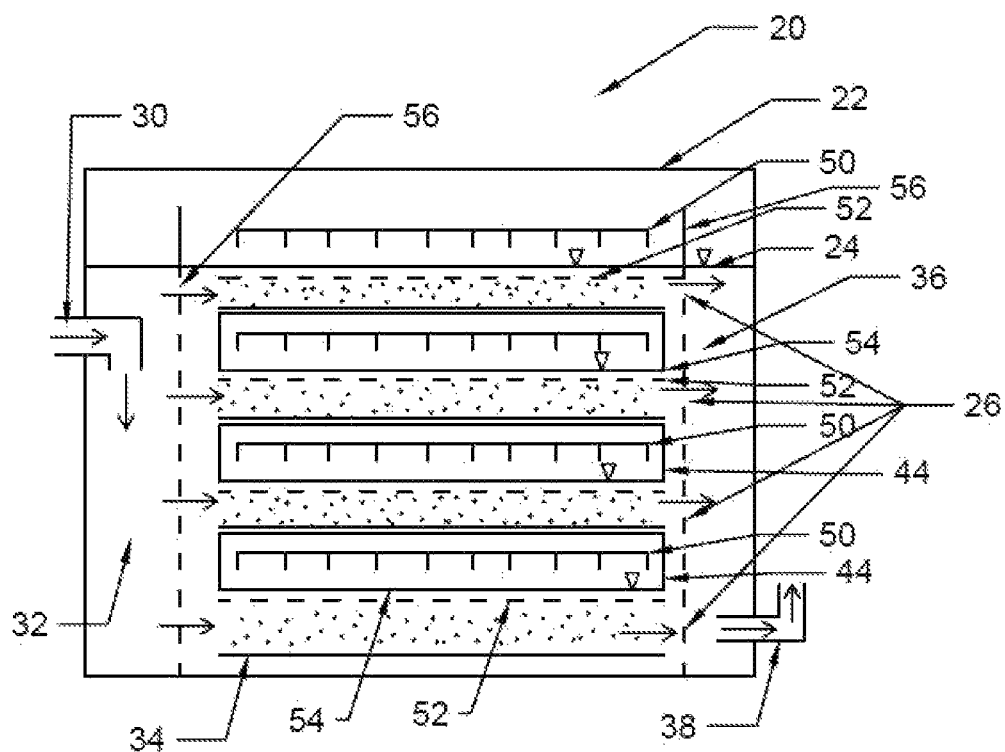
FIG. 2 is a profile view of a basic embodiment with four EDP channels.

FIG. 2 shows a profile view of a basic embodiment of the EDP system (20), installed in a rectangular process tank (22). This embodiment includes four EDP channels (26) (three submerged), for clarity, but more or fewer EDP channels (26) can be installed in one process tank (22).

The water enters the influent zone (32) through the inlet (30), and splits between the multiple EDP channels (26). A gas diffuser (34) at the bottom of each EDP channel (26) is used to introduce process gas bubbles, which convey polar target contaminant(s) to the surface of the EDP channel (26). Electrical discharges between the cathode (50) and submerged anode (52) degrade and/or destroy the target contaminant(s). The electrical connections and power supply are not shown, for clarity, but are familiar to those skilled in the art. Water exits the EDP channel (26) to the effluent zone (36) of the process tank (22) and flows from the process tank (22) as treated effluent through the outlet (38).

The gas hood (44) may be attached to the side walls (48) of the process tank (22), with a shallow gas hood front wall (58) extending down at the influent zone (32) and a shallow gas hood end wall (60) at the outlet zone (36). The gas hood (44) could also be a downturned tray consisting of a top plate with four, short sides extending down, secured at the desired elevation in the process tank (22). Regardless of whether the gas hood (44) has sides in common with the process tank (22), baffle walls (56), etc., the main requirement is that the gas hood (44) maintain a gas headspace at the top of the EDP channel (26) for the cathode (50).

The treatment volume may have a baffle wall (56) between the influent zone (32) and the EDP channels (26), to dissipate energy and promote uniform flow distribution over the face of the EDP channels (26). There are also various options for structures in the effluent zone (36), including, but not limited to, a baffle wall (56) to prevent short circuiting, an outlet weir (not shown), etc. These additional structures are familiar to those skilled in the art.

Figure 3:
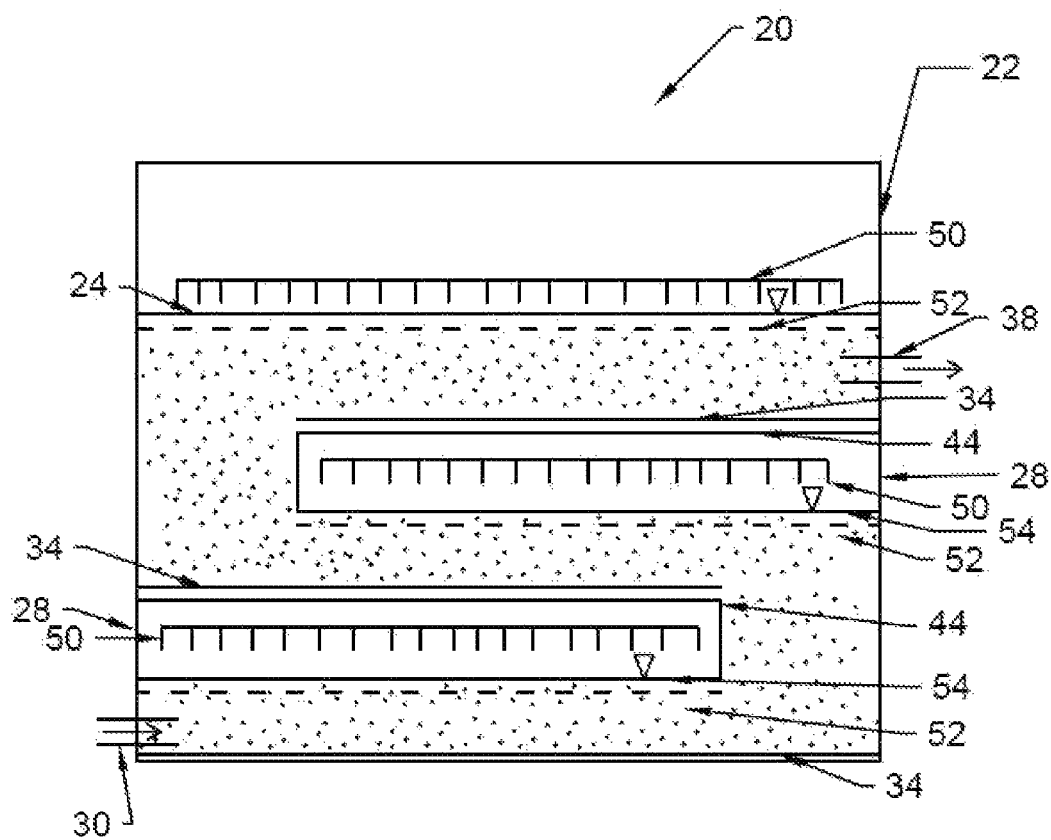
FIG. 3 is a profile view of an embodiment with upward flow with serpentine EDP baffles.

Another continuous flow embodiment is shown in FIG. 3. Instead of parallel flow through horizontal, EDP channels (26), this embodiment has an upflow configuration, using the gas hoods (44) as EDP baffles (28) to direct the flow in a serpentine fashion. Water enters through the bottom (30) of the process tank (22). Process gas is bubbled into the process tank (22) using a gas diffuser (34) located at the bottom of the process tank (22). Supplemental diffusers (34) could also be used, if needed, in the upper parts of the process tank (22). Alternately, process gas could be introduced using a venturi-type injector (not shown), upstream of the process tank (22). The electrical connections and power supply are not shown, for clarity, but are familiar to those skilled in the art.

With some modification, the embodiment shown in FIG. 2 could also be operated in batch mode. The process tank (22) would be full of process gas prior to the start of the treatment cycle. During the Fill step, water would enter through the inlet (30) to the influent zone (32). The rising water level in the process tank (22) would force process gas from the process tank (22) to a separate process gas reservoir (62) (not shown). Once the water reaches the normal operating level in the process tank (22), the influent flow would be shut off and the EDP process started (React step). A water recirculation pump (64) could be used to recirculate the contents of the process tank (22), drawing water from the effluent zone (36) through the outlet and returning the water to the influent zone (32). At the end of the React step, the EDP process and water recirculation pump (64) would be shut off. If a Degas step is needed, the process tank would sit idle for a set length of time to allow the process gas to come out of solution (with optional vacuum assist—not shown). After the Degas step, the process tank (22) would drain through the outlet (38). While water drains from the process tank, the process tank (22) would draw process gas from the process gas reservoir (62).

The continuous flow, upflow embodiment (FIG. 3) could also be modified for batch treatment. The process tank (22) would be full of process gas prior to the cycle. During the Fill step, water would enter through the bottom of the process tank (22), through inlet (30). The rising water level in the process tank (22) would force process gas from the process tank (22) to the process gas reservoir (62). Once the water reaches the normal operating level in the process tank (22), the influent flow would be shut off and the EDP process started (React step). A water recirculation pump (64) could be used to recirculate the contents of the process tank (22), drawing water from the top of the process tank (22) and returning the water to the bottom of the process tank (22). At the end of the React step, the EDP process and recirculation pump 64 would be shut off. If a Degas step is needed, the process tank would sit idle for a set time to allow the process gas to come out of solution (with optional vacuum assist—not shown). After the Degas step, the process tank (22) would drain through the outlet (38). While water drains from the process tank (22), the process tank (22) would draw process gas from the process gas reservoir (62).

In another embodiment (not shown), the EDP system (20) would float or be suspended on a water surface. This embodiment could be used in large tanks, reservoirs or natural water bodies. This embodiment would consist of one or more EDP channels (26) or EDP baffles (28). The top EDP channel (26) or EDP baffle (28) would have a gas hood (44) extending below the surface of the water, to contain and allow for recirculation of the process gas.

Water would pass through the EDP channel (26) either by laterally moving the EDP system (20) or by pumping water through the EDP channel (26).

The invention is not limited to this embodiment, and various modifications can be made therein within the scope of the concept of the invention.

The foregoing invention has been described in accordance with the relevant legal standards, thus the description is exemplary rather than limiting in nature. Variations and modifications to the disclosed embodiment may become apparent to those skilled in the art and fall within the scope of the invention. Furthermore, particular features of one embodiment can replace corresponding features in another embodiment or can supplement other embodiments unless otherwise indicated by the drawings or this specification.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

I claim:

1. A system with for treating target contaminants in a liquid with an electrical discharge plasma (EDP) of the type having a sealed process tank for containing the liquid with an inlet for receiving the liquid influent and an outlet for discharging treated liquid effluent, the process tank having a headspace so as to provide a gas/liquid interface at the top surface of the liquid, a gas diffuser for introducing a process gas into the liquid to create gas bubbles that carry contaminants in the liquid to the gas/liquid interface, a cathode above the top surface of the liquid in the process tank and an anode below the surface of the liquid in the process tank, so that an electrical discharge arcs between the cathode and anode to generate a plasma that destroys contaminants at the gas/liquid interface, the system comprising:

a sealed process tank (22) for containing liquid, said sealed process tank (22) having an inlet (30) wherein liquid enters an influent zone (32) in said sealed process tank (22) and an outlet (38) through which treated liquid exits said sealed process tank (22) from an effluent zone (36) in said sealed process tank (22);

a plurality of EDP channels (26) submerged in the liquid in said sealed process tank (22) through which liquid flows from influent zone (32) to create a channel having a local water surface (54) in each one of said plurality of EDP channels (26), wherein each one of said plurality of EDP channels (26) consists of a cathode (50) located above the local water surface (54) and an anode (52) located below the local water surface (54); a gas hood (44) located at the top of each one of said plurality of EDP channels (26) above the local water surface to create a headspace to provide a local gas/liquid interface in each one of said plurality of EDP channels (26); and a bottom plate; and a gas diffuser (34) for introducing a process gas into the liquid to create bubbles that carry target contaminants in the liquid to the local gas/liquid interfaces.

2. The system for treating target contaminants in a liquid with electrical discharge plasma (EDP) as claimed in claim 1, wherein the electrical discharge arcs between said cathode (50) and said anode (52) in each one of said plurality of EDP channels (26) to create plasma from the process gas to destroy contaminants at the local gas/liquid interfaces.

3. The system for treating target contaminants in a liquid with electrical discharge plasma (EDP) as claimed in claim 1, wherein said gas diffuser (34) is configured to bubble the process gas through the liquid in each one of said plurality of EDP channels (26), wherein the gas bubbles convey polar target contaminants to the local water surface (54) of each one of said plurality of EDP channels (26).

4. The system for treating target contaminants in a liquid with electrical discharge plasma (EDP) as claimed in claim 1, wherein said gas hood (44) is a downturned tray that, when submerged, provides a headspace containing the process gas and said cathode (50).

5. The system for treating target contaminants in a liquid with electrical discharge plasma (EDP) as claimed in claim 1, wherein the top of said gas hood (44) for one of said plurality of EDP channels (26) is configured as a bottom plate for the one of said plurality of EDP channels (26) above it.

6. The system for treating target contaminants in a liquid with electrical discharge plasma (EDP) as claimed in claim 1, wherein the liquid enters the influent zone (32) through inlet (30), and splits between said plurality of EDP channels (26) to create multiple horizontal EDP channels.

7. The system for treating target contaminants in a liquid with electrical discharge plasma (EDP) as claimed in claim 1, wherein said gas diffuser is located in the influent zone (32) to introduce the process gas prior to flow of the liquid into said plurality of EDP channels (26).

* * * * *